US011372644B2

(12) United States Patent
Ulrich et al.

(10) Patent No.: US 11,372,644 B2
(45) Date of Patent: Jun. 28, 2022

(54) MATRIX PROCESSING INSTRUCTION WITH OPTIONAL UP/DOWN SAMPLING OF MATRIX

(71) Applicant: Meta Platforms, Inc., Menlo Park, CA (US)

(72) Inventors: Thomas Mark Ulrich, Mountain View, CA (US); Krishnakumar Narayanan Nair, Newark, CA (US); Yuchen Hao, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/708,224

(22) Filed: Dec. 9, 2019

(65) Prior Publication Data

US 2021/0173646 A1 Jun. 10, 2021

(51) Int. Cl.
*G06F 9/30* (2018.01)
*G06F 9/38* (2018.01)
*G06F 9/54* (2006.01)

(52) U.S. Cl.
CPC ...... *G06F 9/30036* (2013.01); *G06F 9/30043* (2013.01); *G06F 9/30098* (2013.01); *G06F 9/30196* (2013.01); *G06F 9/3877* (2013.01); *G06F 9/3887* (2013.01); *G06F 9/544* (2013.01)

(58) Field of Classification Search
CPC .......................... G06F 9/30036; G06F 9/3887
See application file for complete search history.

(56) References Cited

U.S. PATENT DOCUMENTS

| 10,318,306 | B1* | 6/2019 | Kohn ................... G06F 9/5044 |
| 2002/0198911 | A1 | 12/2002 | Blomgren | |
| 2005/0286794 | A1 | 12/2005 | Brunner et al. | |
| 2011/0211122 | A1 | 9/2011 | Sullivan | |
| 2016/0070536 | A1* | 3/2016 | Maeda ............... G06F 7/49947 708/497 |
| 2018/0004510 | A1* | 1/2018 | Grochowski ........ G06F 9/3001 |
| 2018/0189057 | A1 | 7/2018 | Werner | |
| 2019/0042235 | A1* | 2/2019 | Sade ................... G06F 9/30109 |
| 2019/0339944 | A1* | 11/2019 | Olsen ...................... G06F 7/72 |
| 2019/0340508 | A1* | 11/2019 | Liu ........................ G06N 3/063 |
| 2020/0201932 | A1* | 6/2020 | Gradstein ........... G06F 9/30036 |
| 2020/0265107 | A1* | 8/2020 | Narayanamoorthy ..................... G06F 9/3001 |

(Continued)

OTHER PUBLICATIONS

Communication Pursuant Article 94(3) dated Oct. 4, 2021 for European Application No. 20207032.2, filed Nov. 11, 2020, 7 pages.

(Continued)

*Primary Examiner* — Jacob Petranek
(74) *Attorney, Agent, or Firm* — Van Pelt, Yi & James LLP

(57) ABSTRACT

A processor system comprises a shared memory and a processing element. The processing element includes a matrix processor unit and is in communication with the shared memory. The processing element is configured to receive a processor instruction specifying a data matrix and a matrix manipulation operation. A manipulation matrix based on the processor instruction is identified. The data matrix and the manipulation matrix are loaded into the matrix processor unit and a matrix operation is performed to determine a result matrix. The result matrix is outputted to a destination location.

20 Claims, 11 Drawing Sheets

(56) References Cited

U.S. PATENT DOCUMENTS

2020/0304794 A1* 9/2020 Lai ..................... H04N 19/172
2020/0359050 A1* 11/2020 Van der Auwera .... H04N 19/59

OTHER PUBLICATIONS

Extended European Search Report for European Application No. 20207032.2, dated Apr. 30, 2021, 09 Pages.

Shahbahrami A et al., "SIMD Architectural Enhancements to Improve the Performance of the 2D Discrete Wavelet Transform", Digital System Design, Architectures, Methods and Tools, 2009. DSD '09.12th Euromicro Conference on, IEEE, Piscataway, NJ, USA. Aug. 27, 2009.

* cited by examiner

| 701 | 1 | 0 | 0 | ... | 0 |
| 703 | 1 | 0 | 0 | ... | 0 |
| 705 | 0 | 1 | 0 | ... | 0 |
| 707 | 0 | 1 | 0 | ... | 0 |
| ... | ... | ... | ... | ... | ... |
|  | 0 | 0 | 0 | ... | 1 |
| 709 | 0 | 0 | 0 | ... | 1 |

MATRIX PROCESSING INSTRUCTION WITH OPTIONAL UP/DOWN SAMPLING OF MATRIX

BACKGROUND OF THE INVENTION

A whole class of complex artificial intelligence problems can be solved using neural networks. The implementation of neural network solutions is often dependent on how the input source or intermediate data is formatted and the requirements of neural network operations. Neural network operations may expect the data in a particular format. It is common to convert data from one matrix format to another to improve the accuracy and computational cost for implementing neural network operations. Traditionally, the conversion is challenging to adapt to hardware solutions and is performed in software. It is a challenge to create a hardware solution that is both flexible and offers significant performance improvement and efficiency. Therefore, a flexible and efficient hardware solution for performing matrix manipulation operations, including conversion operations for up-sampling and down-sampling matrices, is needed.

BRIEF DESCRIPTION OF THE DRAWINGS

Various embodiments of the invention are disclosed in the following detailed description and the accompanying drawings.

FIG. 7 is a diagram illustrating an example manipulation matrix and corresponding vector operands for performing a matrix manipulation operation.

FIG. 8 is a diagram illustrating an example input data matrix and corresponding matrix slice for performing a matrix manipulation operation.

FIG. 9 is a diagram illustrating an example result matrix from performing a matrix manipulation operation.

FIG. 11 is a diagram illustrating an example manipulation matrix and corresponding vector operands for performing a matrix manipulation operation.

DETAILED DESCRIPTION

Figure 1:
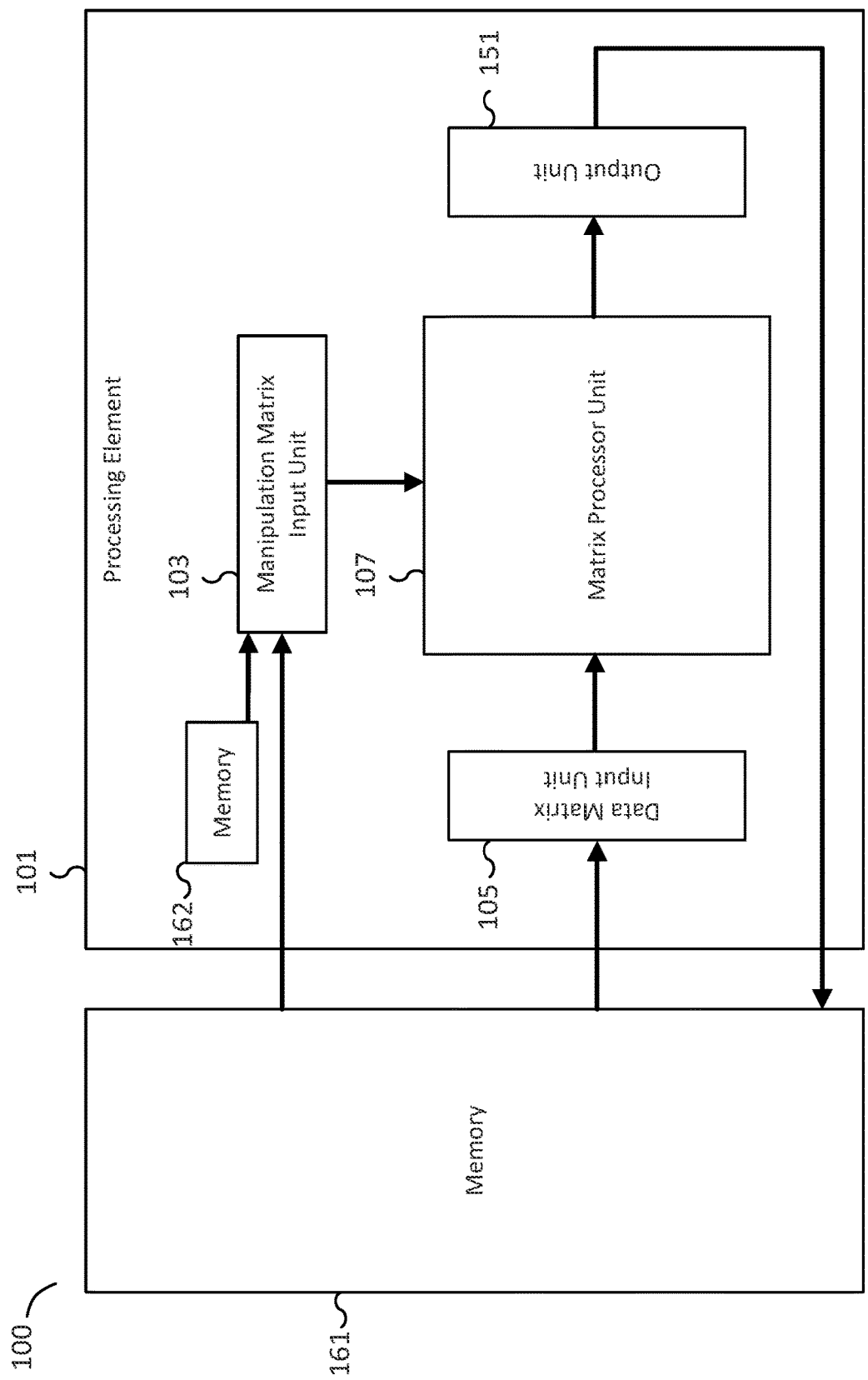
FIG. 1 is a block diagram illustrating an embodiment of a system for performing matrix manipulation operations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A processor system for performing hardware accelerated matrix manipulation operations using processor instructions is disclosed. The matrix manipulation operations supported by the processor system include at least different up-sampling and down-sampling operations. In the disclosed processor system, the processor system includes a hardware matrix processor unit that performs matrix operations such as a matrix multiplication. The processor system supports one or more matrix manipulation operation processor instructions. For example, a processor instruction directs the processor system to up-sample an input data matrix by duplicating each element along a row. As another example, the elements down a column of the input data matrix can also be duplicated, effectively doubling a two-dimensional matrix along both dimensions. In some embodiments, the processor system supports up-sampling a matrix by linear interpolation. Each up-sampling, down-sampling, or another matrix manipulation operation can be performed and described by a designated manipulation matrix. In various embodiments, the designated manipulation matrices corresponding to the different supported matrix manipulation operations are stored in memory. For example, each manipulation matrix of a supported matrix manipulation operation can be stored in memory as a pre-defined matrix. In some embodiments, a manipulation matrix can be dynamically programmed and stored in memory. In response to a specified matrix manipulation processor instruction, the appropriate manipulation matrix is loaded from memory into the matrix processor unit of the processor system. A corresponding input data matrix is multiplied by the manipulation matrix using the matrix processor unit. The output result can be written to memory and/or used by the processor system for subsequent operations, such as matrix operations required for neural network inference or training. In some embodiments, the output is written to memory using strided writes and/or a memory layout unit to up-sample the result matrix of the matrix processor unit in a second dimension. For example, an up-sampling manipulation matrix up-samples the input data matrix in a first dimension, such as doubling the length of each row. Each up-sampled row is then written to memory twice using a memory layout unit to up-sample the input data matrix along the height dimension, effectively doubling the length of each column. The duplicative writes effectively double the size of the final matrix by duplicating the number of rows. In some embodiments, the result matrix of the matrix processor unit is written to memory in two passes to even and then odd (or vice versa) memory row addresses using a memory layout or scatter unit. The memory layout unit can be used to quickly and efficiently output an up-sampled input data matrix to memory.

In some embodiments, a processor system comprises a shared memory and a processing element in communication with the shared memory. For example, a processing element may be a single processing element or one of a matrix of processing elements that each has access to the shared memory via a communication bus. A matrix of processing elements may be a 32×32, 64×64, or another sized matrix of processing elements. The processing element of the processor system includes a matrix processor unit. For example, a matrix processor unit is configured to perform at least a matrix multiplication on two matrix operands to determine a result matrix. In some embodiments, the matrix processor unit includes a first type of register (e.g., 210 of FIG. 2) configured to store all values of a single row of a data matrix and a group of a second type of registers (e.g., 212 of FIG. 2), wherein each of the second type of registers is configured to store all values of a different column of a manipulation matrix. The matrix processor unit also includes a plurality of vector calculation units, wherein each of the plurality of vector calculation units corresponds to one of the second type of registers. Each vector calculation unit is configured to multiply each value stored in the first type of register with a corresponding value stored in the corresponding one of the second type of registers. The multiplication results of the corresponding vector calculation unit are summed to at least in part determine a corresponding element in a result matrix of multiplying the data matrix with the manipulation matrix.

In some embodiments, the processing element is configured to receive a processor instruction specifying a data matrix and a matrix manipulation operation. For example, a specialized processor instruction includes a data matrix operand and specifies a matrix manipulation operation such as an up-sample or down-sample operation. The processing element is further configured to identify a manipulation matrix based on the processor instruction. For example, the processor instruction is decoded to identify a manipulation matrix corresponding to the matrix manipulation operation. In some embodiments, the manipulation matrix is a hardcoded matrix stored in memory or another memory location. The processing element is configured to load the data matrix and the manipulation matrix into the matrix processor unit and perform a matrix operation to determine a result matrix. For example, in some embodiments, each column of the manipulation matrix is loaded into a vector computational unit of the matrix processor unit. For each row of the data matrix, the row is loaded or broadcasted to every vector computational unit with a corresponding column of the manipulation matrix. Each vector computational unit computes a dot-product result corresponding to an element in the result matrix. The processing element is configured to output the result matrix to a destination location. For example, the result matrix may be outputted to memory or another location such as a matrix register. In some embodiments, the outputting performs an up-sampling of the result matrix along one dimension of the data matrix. For example, each row is written out twice to duplicate the number of rows. In some embodiments, the manipulation matrix is an up-sampling, down-sampling, or another type of manipulation matrix for performing a matrix manipulation operation.

FIG. 1 is a block diagram illustrating an embodiment of a system for performing matrix manipulation operations. In the example shown, system 100 includes processing element 101 and memory 161. Processing element 101 includes manipulation matrix input unit 103, data matrix input unit 105, matrix processor unit 107, and output unit 151. Matrix processor unit 107 is a dot product engine and can perform matrix multiplication on two input matrices, a data matrix and a manipulation matrix. In some embodiments, matrix processor unit 107 includes multiple vector units (not shown) used to compute a matrix multiplication. Matrix processor unit 107 receives a manipulation matrix (not shown) from manipulation matrix input unit 103 and an input data matrix (not shown) from data matrix input unit 105 to perform the result of multiplying the input data matrix by the manipulation matrix. The result is outputted to output unit 151, which can be used to write the matrix multiplication results to memory 161. For example, in some embodiments, a two-dimensional manipulation matrix is prepared by manipulation matrix input unit 103 and successive input data vectors of a two-dimensional input data matrix are prepared by data matrix input unit 105. The two-dimensional manipulation matrix and the two-dimensional input data matrix may be retrieved from memory 161 and may be referenced by a memory address. In some embodiments, the input data matrix is referenced by a memory address and the manipulation matrix is determined by the matrix manipulation operation specified by a processor instruction. The two matrices are multiplied and the output is received at output unit 151. In some embodiments, the result matrix is computed one row each cycle by loading one row of the input data matrix each cycle into matrix processor unit 107.

In some embodiments, a processor instruction directed to processing element 101 references an input data matrix and a specific manipulation matrix. For example, the manipulation matrix may be a manipulation matrix for performing an up-sampling or a down-sampling operation. Moreover, the manipulation matrix may be one of several different types of up-sampling or down-sampling matrices or a matrix corresponding to another matrix manipulation operation. For example, for up-sampling operations, an up-sampling manipulation matrix may up-sample by doubling every row element, by performing linear interpolation between elements, by quadrupling every row element, or by using another up-sampling scheme. In various embodiments, the manipulation matrices are hardcoded in memory 161 and/or stored in another memory location. In some embodiments, the manipulation matrices for each matrix manipulation operation may be dynamically configured and stored in memory 161 and/or another memory location. In response to a matrix manipulation operation processor instruction, processing element 101 loads the proper manipulation matrix from memory 161 into matrix processor unit 107 via manipulation matrix input unit 103 and the corresponding input data matrix from memory 161 into matrix processor unit 107 via data matrix input unit 105. In some embodiments, the dimensions of the input data matrix are larger than are supported by matrix processor unit 107 and the input data matrix is processed as two-dimensional slices of the input data matrix, where matrix processor unit 107 supports the dimensions of the two-dimensional slices. For example, a 32×32 matrix processor unit can receive 32×32 slices of a much larger input data matrix. In various embodiments, the final matrix resulting from the matrix manipulation operation can have different dimensions from the input data matrix. For example, an up-sampling matrix manipulation operation results in a larger final matrix and a down-sampling matrix manipulation operation results in a smaller final matrix.

In various embodiments, the arrows of FIG. 1 represent the direction data moves through the components of system 100. For example, the arrows may correspond to multi-element wide communication/data buses and/or data lines. In some embodiments, output unit 151 includes a memory layout or scatter unit (not shown) for implementing strided writes of the result matrix to memory. For example, output unit 151 stores the result matrix from matrix processor unit 107 and writes out the matrix to memory 161. Each row is written to memory twice using a memory layout unit to up-sample the input data matrix along the height dimension, effectively doubling the length of each column. In some embodiments, additional components of system 100 and processing element 101 are not shown. For example, a control logic unit for processing and decoding processor instructions is not shown. As another example, in some embodiments, processing element 101 includes local storage memory 162 that is used to store one or more manipulation matrices used for implementing one or more matrix manipulation operations. In response to a processor instruction, manipulation matrix input unit 103 loads a corresponding manipulation matrix from local storage memory, bypassing the time required to load data from memory 161. In some embodiments, a manipulation matrix stored in local storage memory can be dynamically and programmatically configured.

In some embodiments, processing element 101 is one of a plurality of processing elements (not shown) connected to memory 161. Memory 161 is a shared memory that each of the plurality of processing elements can access. For example, the processing elements may be arranged as a matrix of processing elements such as a grid of 32×32 processing elements. The processing elements can be configured to operate in parallel with one another. For example, different processing elements can perform different matrix manipulation operations in parallel. In some embodiments, the different processing elements can perform portions of the same matrix manipulation operation in parallel but on different slices of an input data matrix. The final result matrix may be written out to memory 161 as a complete result matrix by different processing elements writing their respective partial result matrices to memory. The performance of matrix manipulation operations is significantly increased by spreading the processing across different processing elements, with each processing element performing a portion of the matrix manipulation operation on an assigned portion of the input data matrix.

Figure 2:
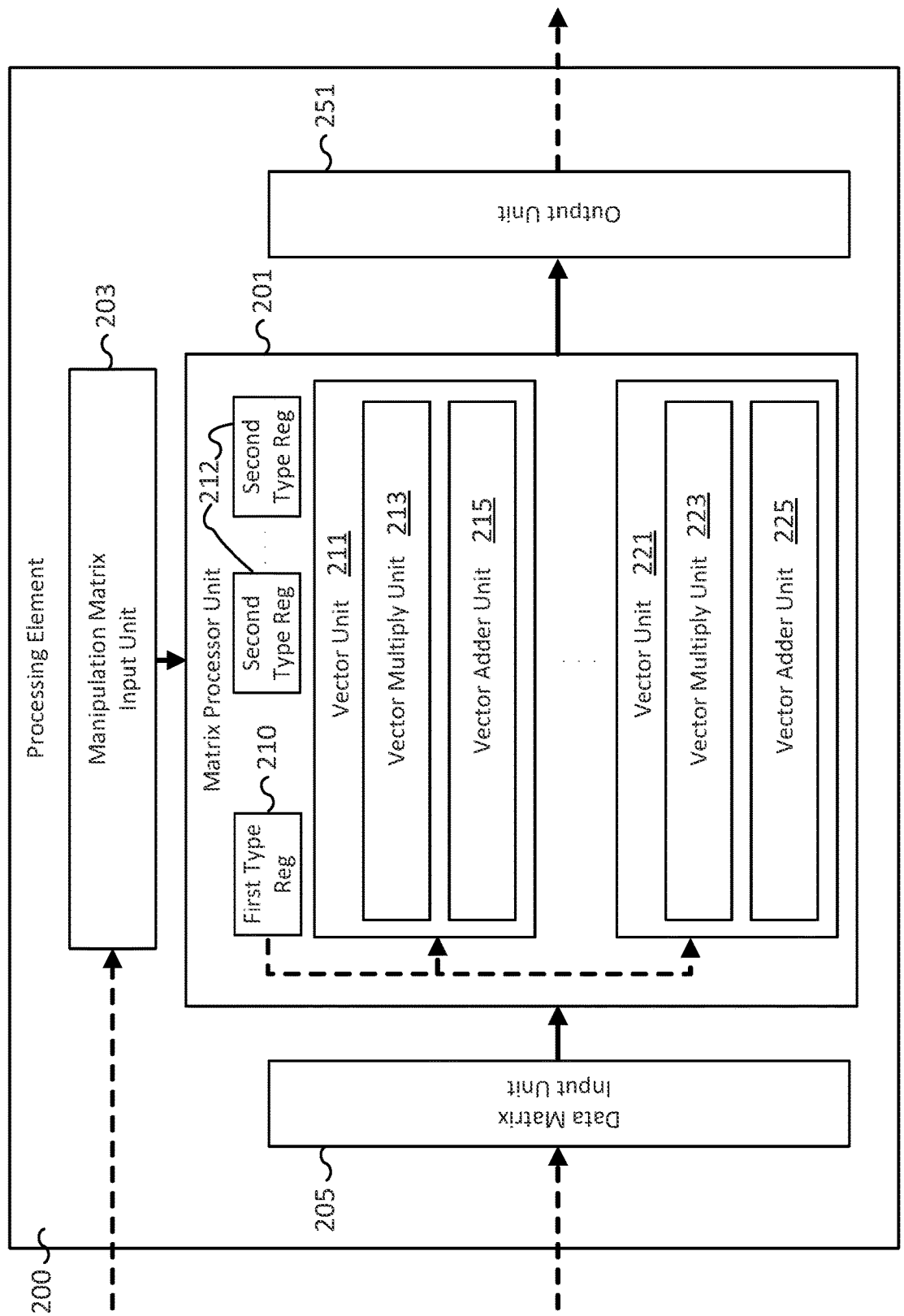
FIG. 2 is a block diagram illustrating an embodiment of a processing element for performing matrix manipulation operations.

FIG. 2 is a block diagram illustrating an embodiment of a processing element for performing matrix manipulation operations. In the example shown, processing element 200 includes matrix processor unit 201, manipulation matrix input unit 203, data matrix input unit 205, and output unit 251. Matrix processor unit 201 includes multiple vector units including at least vector units 211 and 221. Each vector unit includes at least a vector multiply unit and a vector adder unit. For example, vector unit 211 includes vector multiply unit 213 and vector adder unit 215. And vector unit 221 includes vector multiply unit 223 and vector adder unit 225. In various embodiments, matrix processor unit 201 includes at least the number of vector units to match the number of elements in an input data vector generated by data matrix input unit 205. In various embodiments, matrix processor unit 201 is configured to receive two input matrices, each matrix a two-dimensional matrix via manipulation matrix input unit 203 and data matrix input unit 205, respectively, and output a matrix result to output unit 251. In some embodiments, processing element 200 is processing element 101 of FIG. 1 and matrix processor unit 201, manipulation matrix input unit 203, data matrix input unit 205, and output unit 251 are matrix processor unit 107, manipulation matrix input unit 103, data matrix input unit 105, and output unit 151, respectively, of FIG. 1. In some embodiments, processing elements, such as processing element 200, and multiple matrix processor units, such as matrix processor unit 201, may be utilized in parallel for increased performance. For example, one processing element and its matrix processor unit can be used to process one slice of a large input data matrix and another processing element and its matrix processor unit can be used to process a separate slice of the same input data matrix.

In some embodiments, manipulation matrix input unit 203 is used to load a manipulation matrix into matrix processor unit 201 as separate vector operands corresponding to different columns of the manipulation matrix. For example, data corresponding to at least a portion of a two-dimensional manipulation matrix can be read from memory and processed by manipulation matrix input unit 203 before being loaded into matrix processor unit 201. In various embodiments, each vector operand generated by manipulation matrix input unit 203 may be directed to any one of the vector units of matrix processor unit 201, such as vector multiply unit 213 or 223. Each vector unit can be loaded with a different corresponding column of the manipulation matrix. For example, in some embodiments, matrix processor unit 201 includes 32 vector units. Over 32 cycles, 32 vector operands can be loaded into matrix processor unit 201 via manipulation matrix input unit 203. For each cycle, one vector operand is generated by manipulation matrix input unit 203 and then loaded into one of the 32 vector units. After 32 cycles, all 32 vector units have received a vector operand, each corresponding to a column of a 32-column manipulation matrix. In some embodiments, multiple data input vectors can be generated and loaded each cycle. For example, four input vectors can be generated in parallel to load 32 vector units in 8 cycles.

In some embodiments, data matrix input unit 205 is used to load an input data matrix into matrix processor unit 201 as separate vector operands corresponding to different rows of the input data matrix. For example, data corresponding to at least a portion of a two-dimensional input data matrix can be read from memory and processed by data matrix input unit 205 before being loaded into matrix processor unit 201. Each input data vector operand generated by data matrix input unit 205 corresponds to a row of the input data matrix and can be directed to any one, subset, or all of the vector units of matrix processor unit 201, such as vector multiply unit 213 or 223. For example, the same input data vector operand can be broadcasted to multiple vector units of matrix processor unit 201 to compute an entire output row of the modified matrix result. By broadcasting the same vector operand corresponding to a row of the input data matrix to multiple vector units, multiple vector units compute a dot product of the same data matrix row with different manipulation matrix columns in parallel. Once the results of an entire row of the modified matrix are determined, a vector operand corresponding to the next row of the input data matrix can be broadcasted to the appropriate vector units to determine the next output row of the modified matrix. In some embodiments, each row of the manipulation matrix is instead broadcasted to vector units corresponding to the different columns of the input data matrix.

In some embodiments, some elements of the vector operands may be unused or zeroed out. For example, an up-sampling manipulation operation may correspond to a 16×32 manipulation matrix that utilizes 16-element vectors for each column and/or a 32×16 input data matrix that utilizes 16-element vectors for each row. Each of the 32 vector units of a 32×32 matrix processor unit is loaded with a pair of 16-element vectors corresponding to a column of the 16×32 manipulation matrix and a row of the 32×16 input data matrix. The 16-element vector operand may be a 32-element vector with 16 zero-value or padding elements. The vector operands are prepared by manipulation matrix input unit 203 and/or data matrix input unit 205. Similarly, in some embodiments, only a subset of the vector units of matrix processor unit 201 is utilized. For example, a down-sampling manipulation operation may correspond to a 32×16 manipulation matrix that utilizes 32-element vectors for each column but only requires 16 vector units to load the entire 32×16 manipulation matrix into a 32×32 matrix processor unit. The vector operands are prepared by manipulation matrix input unit 203 and/or data matrix input unit 205 and directed to the appropriate vector units.

In some embodiments, input vector operands generated by manipulation matrix input unit 203 and data matrix input unit 205 are passed as vector arguments to a vector unit, such as one of vector units 211 and 221, of matrix processor unit 201. Each vector unit of matrix processor unit 201 may determine a dot product result using the input vectors corresponding to a row of an input data matrix and a column of a manipulation matrix. In some embodiments, matrix processor unit 201 includes 32 vector units. Each vector unit may take two 32-element vectors as arguments and each can produce a single element result. Taken across all utilized vector units, the results are an output vector result and correspond to an output row of the modified matrix. In various embodiments, the output of matrix processor unit 201 can be an output vector and is received at output unit 251. Over multiple cycles, the output received at output unit 251 is a matrix result. In some embodiments, the output vector received at output unit 251 is a 32-element vector. Other vector lengths may be utilized as appropriate. For example, a 16-element vector can be outputted by taking the outputs of only 16 of the 32 vector units. Similarly, the size of the elements processed by processing element 200 can be configured as appropriate. For example, elements may be 4-bits, 8-bits, 2-byte, 4-bytes, or another appropriate size.

In some embodiments, the number of cycles required to load a vector operand from memory via manipulation matrix input unit 203 and/or data matrix input unit 205 into matrix processor unit 201 is based on the utilization of the matrix processor unit. For example, to keep matrix processor unit 201 near full utilization, data arguments for the vector units are retrieved from memory and prepared over a time period (e.g., a certain number of cycles) that closely matches the compute utilization of the vector units. By matching the load and compute times, matrix processor unit 201 can be kept near full utilization. In some embodiments, data read times are reduced, for example, by increasing the bus speed, to better match the load and compute times. For example, in various embodiments, matrix processor unit 201 may take approximately eight clock cycles to complete a certain set of computations. (An example of a set of computations might include applying eight different rows of an input data matrix to a set of input vectors corresponding to a manipulation matrix.) A read rate of one vector operand per cycle would require at least 32 cycles to load all vector units. Increasing the read rate by a factor of four allows all 32 vector operands to be loaded in approximately 8 cycles, matching the processing compute time of the matrix processor unit. In various embodiments, by matching the data read speed, for example, the data bus speed used to load vector operands, with matrix processor unit compute performance and workload, the overall efficiency and throughput of matrix processor unit 201 is significantly increased. In some embodiments, the read speed is at least in part increased using the techniques disclosed herein. For example, multiple vector operands corresponding to different columns of the manipulation matrix may be generated in parallel by manipulation matrix input unit 203 to multiply the overall effective read speed. In some embodiments, manipulation matrix input unit 203 may process multiple input vectors in parallel to reduce the number of cycles required to load a corresponding manipulation matrix into matrix processor unit 201.

In some embodiments, matrix processor unit 201 includes multiple vector units that each include a vector multiply and vector adder unit. Each vector multiply unit, such as vector multiply unit 213 or 223, is configured to multiply corresponding elements received via manipulation matrix input unit 203 and data matrix input unit 205. In some embodiments, the result is a vector of multiplication results. For example, for two 32-byte input vectors, the result of a vector multiply unit is a vector of 32 multiplication results. The first element of an input data matrix row from data matrix input unit 205 is multiplied with the first element of a manipulation matrix column from manipulation matrix input unit 203. Similarly, the second element of an input data matrix row is multiplied with the second element of a manipulation matrix column. In various embodiments, the vector of multiplication results is passed to a vector adder unit of the vector unit. For example, vector multiply unit 213 passes its multiplication results to vector adder unit 215 and vector multiply unit 223 passes its multiplication results to vector adder unit 225.

In some embodiments, each vector adder unit, such as vector adder unit 215 or 225, is configured to compute the sum of the elements from an input vector. For example, the sum of each of the elements from a vector of multiplication results computed by vector multiply unit 213 is computed by vector adder unit 215. Similarly, the sum of each of the elements from a vector of multiplication results computed by vector multiply unit 223 is computed by vector adder unit 225. In some embodiments, the result of a vector adder unit is a dot product of the vectors used as input to the corresponding vector multiply unit. In various embodiments, each vector adder unit, such as vector adder unit 215 or 225, is implemented as an adder tree. For example, the top level of an adder tree may add pairs of elements to determine a set of partial sums, such as adding elements 0 and 1 to determine a first partial sum and elements 2 and 3 to determine a second partial sum, etc. Each subsequent level may sum pairs of partial sums from the previous level until the last level computes a final result sum. In various embodiments, each adder tree computes partial sums in parallel to arrive at a result sum. The parallel operation significantly improves the efficiency of summing a vector of numbers. In various embodiments, multiple vector units can operate in parallel to compute multiple dot products in parallel, significantly improving the throughput of matrix manipulation operations.

Figure 3:
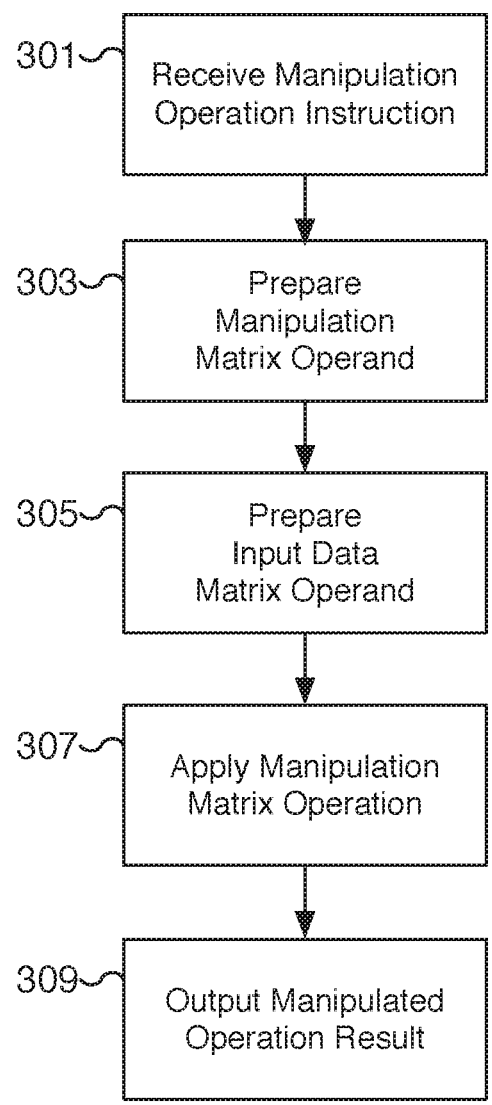
FIG. 3 is a flow chart illustrating an embodiment of a process for performing a matrix manipulation operation using a processor instruction to a processing element with a matrix processor unit.

FIG. 3 is a flow chart illustrating an embodiment of a process for performing a matrix manipulation operation using a processor instruction to a processing element with a matrix processor unit. For example, a matrix manipulation operation is performed using a hardware matrix processor unit in response to receiving a processor instruction at a processing element. The instruction specifies that type of matrix manipulation operation, such as a type of up-sampling, down-sampling, or another appropriate operation to perform and the source input data matrix to perform the operation on. In some embodiments, the resulting matrix has different dimensions than the input matrix. For example, an up-sampling matrix manipulation operation results in a longer length along the up-sampled dimension and a down-sampling matrix manipulation operation results in a shortened length along the down-sampled dimension. In some embodiments, the matrix manipulation operation is performed using matrix processor unit 107 of FIG. 1 and/or matrix processor unit 201 of FIG. 2.

At 301, a matrix manipulation operation processor instruction is received. For example, a processor instruction specifying a matrix manipulation operation, such as a type of up-sampling, down-sampling, or another appropriate matrix manipulation operation is received at a processing element. An up-sampling operation may correspond to doubling the width of the input matrix by repeating every element. Another up-sampling operation may correspond to nearly doubling the width of the input matrix by linearly interpolating every other element. Other matrix operations are appropriate as well. The processor instruction also specifies an input data matrix, such as a two-dimensional data matrix stored in memory. The input data matrix may be referenced by a memory location such as a memory address in memory, a register location, or another memory reference. In some embodiments, the memory location is a local memory of the processing element.

At 303, a manipulation matrix operand is prepared. For example, a manipulation matrix corresponding to the matrix manipulation operation of the processor instruction received at 301 is identified and prepared for a matrix processor unit. The manipulation matrix may be retrieved from memory, local memory of the processing element, or another memory location, such as a matrix register. In some embodiments, the manipulation matrix operand is prepared by preparing operand vectors corresponding to each column of the manipulation matrix. Each vector operand of the manipulation matrix can be loaded into corresponding vector units of the matrix processor unit. In some embodiments, the matrix processor unit operates on vector sizes larger than the column length of the manipulation matrix and only a subset of the vector elements are used. For example, unused vector elements of a vector operand are replaced with zero-value or padding elements. A 16-element column vector is stored in a 32-element vector operand using 16 elements from the appropriate manipulation matrix column and another 16 zero-value elements. In some embodiments, the manipulation matrix operand is prepared by a manipulation matrix input unit such as manipulation matrix input unit 103 of FIG. 1 and/or manipulation matrix input unit 203 of FIG. 2.

At 305, an input data matrix operand is prepared. For example, an input data matrix is prepared for a matrix processor unit to perform the matrix manipulation operation of the processor instruction received at 301. The input data matrix may be retrieved from memory, local memory of the processing element, or another memory location, such as a matrix register. In some embodiments, the input data matrix operand is prepared by preparing operand vectors corresponding to each row of the input data matrix. Each vector operand can be broadcasted to vector units of the matrix processor unit that receive a corresponding column of the manipulation matrix at 303. In some embodiments, the matrix processor unit operates on vector sizes larger than the row length of the input data matrix and only a subset of the vector elements are used. For example, unused vector elements of a vector operand are replaced with zero-value or padding elements. In some embodiments, the input data matrix operand is prepared by a data matrix input unit such as data matrix input unit 105 of FIG. 1 and/or data matrix input unit 205 of FIG. 2.

In some embodiments, the input data matrix is larger in dimensions than supported by the matrix processor unit and/or manipulation matrix. For example, a matrix processor unit may operate on matrices up to 32×32 elements. In the event the input data matrix has dimensions larger than 32×32 and/or is a size incompatible with the manipulation matrix, the input data matrix is sliced into appropriate two-dimensional matrix slices compatible with the matrix processor unit and manipulation matrix. For example, an up-sampling manipulation matrix may utilize a 16×32 manipulation matrix. The input data matrix is sliced into 32×16 input data slices that are compatible with both a 32×32 matrix processor unit and the 16×32 manipulation matrix to output an up-sampled result matrix. In the event there are multiple input data slices, the matrix manipulation operation may be performed on each slice. In some embodiments, such as interpolation operations, the slices may overlap.

At 307, the matrix manipulation operation is applied. For example, using the manipulation matrix operand and the input data matrix operand prepared at 303 and 305, respectively, a two-dimensional matrix manipulation operation is performed by a matrix processor unit. In some embodiments, the matrix manipulation operation is performed over a number of cycles, operating on one row of the input data matrix (or input data matrix slice) at a time to determine one row of an output matrix at a time. For example, the matrix processor unit may output a single vector result each cycle corresponding to one row of the result matrix. Each element of a row vector is determined by computing a dot product of one row of the input data matrix against a different column of the matrix manipulation. In various embodiments, the output of the matrix manipulation operation is a result matrix determined by multiplying the input data matrix by the manipulation matrix. In some embodiments, the output result is received by an output unit such as output unit 151 of FIG. 1 and/or output unit 251 of FIG. 2.

At 309, the manipulated operation result is outputted. For example, the resulting matrix is outputted to memory or another location. In some embodiments, the resulting matrix is written to memory such as memory 161 of FIG. 1. In some embodiments, the resulting matrix is written to a matrix register, which can be one or more registers for storing a matrix for future access by a processing element. The outputting functionality may perform additional matrix manipulation. For example, the outputting may be performed using multiple passes and strided writes to up-sample the matrix along a height dimension. In some embodiments, the strided writes are performed using a memory layout or scatter unit. Using the same output matrix of the matrix processor unit, a final matrix is outputted by writing every row of the output matrix to every other row of the final matrix over two passes. To output a 32×32 matrix using a 16×32 output matrix, the first pass fills in the odd rows (e.g., rows 1, 3, 5, . . . , and 31) and the second pass fills in the even rows (e.g., rows 2, 4, 6, . . . , and 32).

In some embodiments, the output unit may enforce the output dimensions of the result matrix. For example, a down-sampled input data matrix is smaller in at least one dimension than the input data matrix, such as when down-sampling a 32 column input matrix to 16 columns. In some embodiments, each of 32 vector units of a 32×32 matrix processor unit is capable of outputting a single dot product result each cycle. Instead of utilizing the output of all 32 vector units, the output of the matrix processor unit is trimmed to the 16 elements corresponding to the 16 columns of the down-sampled row. In some embodiments, the output dimensions are in part determined by an output unit such as output unit 151 of FIG. 1 and/or output unit 251 of FIG. 2. For example, an output unit selects the output from only vector units that have applicable results for the result matrix.

Figure 4:
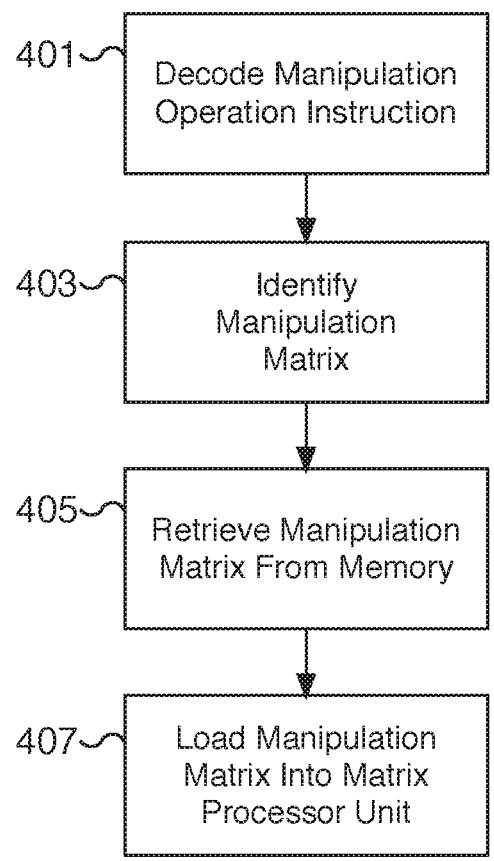
FIG. 4 is a flow chart illustrating an embodiment of a process for performing a matrix manipulation operation using a processor instruction to a processing element with a matrix processor unit.

FIG. 4 is a flow chart illustrating an embodiment of a process for performing a matrix manipulation operation using a processor instruction to a processing element with a matrix processor unit. For example, a processor instruction is received at a processing element and decoded to prepare a manipulation matrix for performing a matrix manipulation operation. The matrix processor unit applies the manipulation matrix to input data specified by the processor instruction to perform the matrix manipulation operation. In some embodiments, the process of FIG. 4 is performed at 301 and/or 303 of FIG. 3. In some embodiments, the process of FIG. 4 is performed by system 100 of FIG. 1 using a processing element such as processing element 101 of FIG. 1 and/or processing element 200 of FIG. 2.

At 401, a matrix manipulation operation processor instruction is decoded. For example, a processor instruction specifying a specific matrix manipulation operation, such as a type of up-sampling, down-sampling, or another appropriate matrix manipulation operation, is decoded at a processing element. In some embodiments, the decoding is performed by a control logic unit of the processing element. The processor instruction directs the processing element to perform a matrix manipulation operation on an input data matrix. In some embodiments, the decoding includes determining the specific matrix manipulation operation and associated manipulation matrix, determining the input data matrix and its dimensions, and determining the output result, its dimensions, and the destination to output the result to. In some embodiments, the decoding also determines the output functionality associated with outputting the results. For example, the output functionality may include parameters for strided writes to further up-sample the output.

At 403, the manipulation matrix is identified. For example, every matrix manipulation operation is associated with a manipulation matrix and, at 403, the manipulation matrix for the decoded processor instruction is identified. In some embodiments, the identification includes determining the memory location, such as a memory address location or matrix register, of the manipulation matrix. In some embodiments, the identification includes determining the dimensions of the manipulation matrix.

At 405, the manipulation matrix is retrieved from memory. For example, the manipulation matrix is retrieved from memory via a manipulation matrix input unit. In some embodiments, the manipulation matrix input unit is manipulation matrix input unit 103 of FIG. 1 and/or manipulation matrix input unit 203 of FIG. 2. In some embodiments, the manipulation matrix is retrieved from local memory of the processing element, a matrix register, or another appropriate memory location identified at 403. In some embodiments, the manipulation matrix is retrieved one column at a time over multiple cycles.

At 407, the manipulation matrix is loaded into the matrix processor unit. For example, the manipulation matrix is loaded into a matrix processor unit via a manipulation matrix input unit. In some embodiments, the manipulation matrix input unit loads the manipulation matrix into the matrix processor unit one column vector at a time. For example, each column of the manipulation matrix is processed into a vector operand and loaded into a corresponding vector unit of the matrix processor unit. In some embodiments, multiple cycles are needed to load an entire manipulation matrix into the matrix processor unit. Once loaded into the matrix processor unit, the manipulation matrix can be reused and applied to different rows of the input data matrix. In some embodiments, the dimensions of the manipulation matrix are smaller than the largest matrix supported by the matrix processor unit and only a subset of the vector units of the matrix processor unit are utilized. For example, a 32×16 down-sampling manipulation matrix only requires 16 vector units, one for each of the 16 columns of the manipulation matrix. Each of the 16 vector units receives a 32-element vector corresponding to one of the 16 columns.

Figure 5:
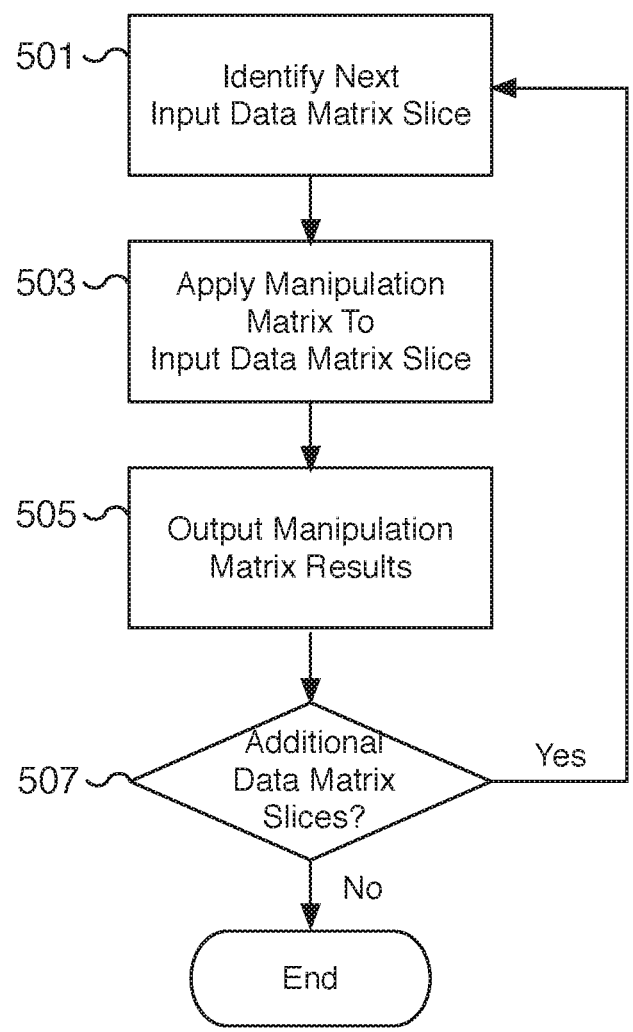
FIG. 5 is a flow chart illustrating an embodiment of a process for performing a matrix manipulation operation using a processor instruction to a processing element with a matrix processor unit.

FIG. 5 is a flow chart illustrating an embodiment of a process for performing a matrix manipulation operation using a processor instruction to a processing element with a matrix processor unit. For example, a matrix manipulation operation is performed on an input data matrix specified by a processor instruction. The input data matrix may be too large to load into the matrix processor unit or the dimensions are incompatible with the corresponding manipulation matrix. Instead, the input data matrix is sliced into smaller matrices compatible with the operand size of a matrix processor unit and the manipulation matrix. Each slice is processed by the matrix processor unit by applying a corresponding manipulation matrix loaded into the matrix processor unit to each input data matrix slice. In some embodiments, the compatible-sized slices can be passed as operands to one or more different matrix processor units and the results combined. In some embodiments, the slices are operated on different matrix processor units, for example, matrix processor units corresponding to different processing elements. In various embodiments, the process of FIG. 5 may be performed in response to a matrix manipulation operation instruction received at 301 of FIG. 3. In some embodiments, the process of FIG. 5 is performed at 305, 307, and/or 309 of FIG. 3. In some embodiments, the process of FIG. 5 is performed by system 100 of FIG. 1 using a processing element such as processing element 101 of FIG. 1 and/or processing element 200 of FIG. 2 and a matrix processor unit such as matrix processor unit 107 of FIG. 1 and/or matrix processor unit 201 of FIG. 2.

At 501, the next input data matrix slice of the input data matrix is identified. For example, an input data matrix is sliced into one or more input data matrix slices with sizes compatible with the operand size of the matrix processor unit and the manipulation matrix. In some embodiments, the slices overlap. The slices may be identified in memory and a read request may be issued to load the identified data. In some embodiments, it may be common for the size of the input data matrix to be extremely large compared to the operand size of the matrix processor unit. The input data matrix is sliced into smaller compatible sizes for processing. At 501, the next slice is identified for processing.

At 503, the manipulation matrix is applied to the input data matrix slice. For example, an input data matrix slice is multiplied by the manipulation matrix using a matrix processor unit. The resulting matrix may be received at an output unit of the processing element. In some embodiments, the matrix manipulation operation is performed on the input data matrix slice over a number of cycles, operating on one row of the input data matrix slice at a time to determine one row of an output matrix at a time. For example, the matrix processor unit may output a single vector result each cycle corresponding to one row of the result matrix. Each element of a row vector is determined by computing a dot product of one row of the input data matrix slice against a different column of the matrix manipulation.

At 505, manipulation matrix results are outputted. For example, each vector unit of the matrix processor unit determines an element of an output vector. The output vector may correspond to a complete row of a result matrix and is received at an output unit such as output unit 151 of FIG. 1 and/or output unit 251 of FIG. 2. In various embodiments, the output unit gathers vector unit results over multiple iterations corresponding to multiple rows of the result matrix. The output unit writes the result matrix to memory, such as memory 161 of FIG. 1, or another appropriate memory location. In some embodiments, the result matrix is a slice of a larger result matrix, where the larger result matrix is the result of applying the matrix manipulation operation to the original input data matrix.

In some embodiments, the outputting functionality may perform additional matrix manipulation as described with respect to step 309 of FIG. 3. For example, the outputting may be performed using multiple passes and strided writes to up-sample the matrix along a height dimension. The output unit may also enforce the output dimensions of the result matrix. The output dimensions may be determined in part by an output unit such as output unit 151 of FIG. 1 and/or output unit 251 of FIG. 2. For example, an output unit selects the output from only vector units that have applicable results for the result matrix.

At 507, a determination is made whether additional data matrix slices require processing. In the event an additional data matrix slice remains to be processed, processing loops back to 501 to process the next slice. In the event no additional data matrix slice remains to be processed, processing ends.

Figure 6:
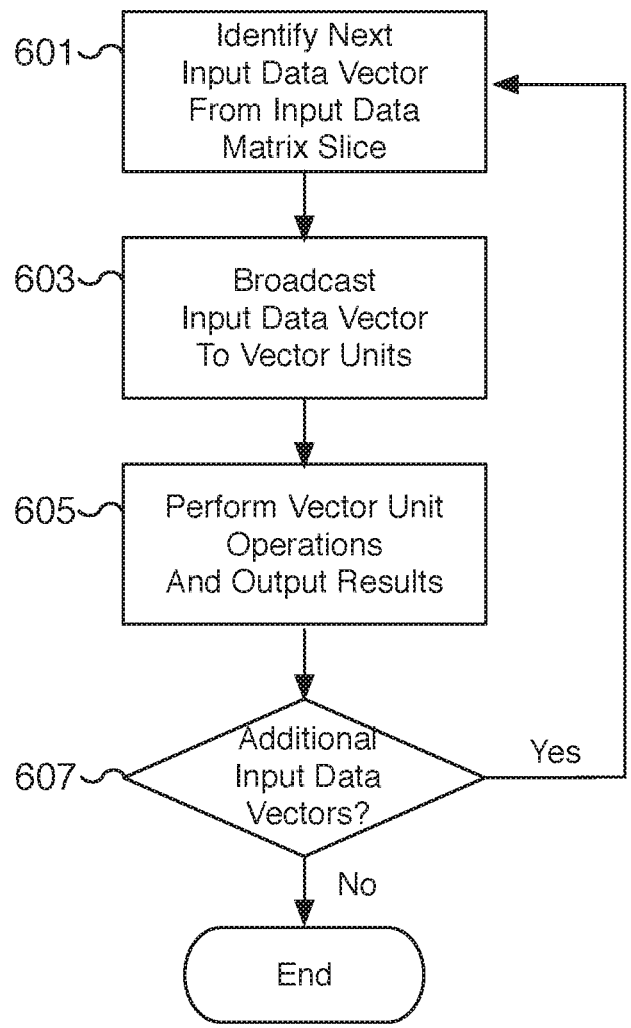
FIG. 6 is a flow chart illustrating an embodiment of a process for performing a matrix manipulation operation using a processor instruction to a processing element with a matrix processor unit.

FIG. 6 is a flow chart illustrating an embodiment of a process for performing a matrix manipulation operation using a processor instruction to a processing element with a matrix processor unit. For example, a matrix manipulation operation specified by a processor instruction is performed on an input data matrix compatible with the operand size of a matrix processor unit and the manipulation matrix. In some embodiments, the input data matrix is an input data matrix slice. Each input data matrix is processed by the matrix processor unit by applying a corresponding manipulation matrix loaded into the matrix processor unit to each input data matrix. In some embodiments, each row of the input data matrix is processed as an input data vector operand and broadcasted to multiple vector units of the matrix processor unit. Each of the multiple vector units of the matrix processor unit also receives a corresponding column of the manipulation matrix as a second vector operand. The dot product results calculated by the vector units together form a row of the result matrix. In various embodiments, the process of FIG. 6 may be performed in response to a matrix manipulation operation instruction received at 301 of FIG. 3 and/or may be performed on an input data matrix slice identified at 501 of FIG. 5. In some embodiments, the process of FIG. 6 is performed at 305 and/or 307 of FIG. 3 and/or at 503 of FIG. 5. In some embodiments, the process of FIG. 6 is performed by system 100 of FIG. 1 using a processing element such as processing element 101 of FIG. 1 and/or processing element 200 of FIG. 2 and a matrix processor unit such as matrix processor unit 107 of FIG. 1 and/or matrix processor unit 201 of FIG. 2.

At 601, the next input data vector from the input data matrix slice is identified. For example, an input data vector corresponding to a row of the input data matrix slice is identified and prepared for a matrix processor unit. In some embodiments, the data is read from memory. In various embodiments, the input data vector is a vector operand for the matrix processor unit prepared by a data matrix input unit such as data matrix input unit 105 of FIG. 1 and/or data matrix input unit 205 of FIG. 2. During each pass through step 601, the next input data vector corresponding to a row of the input data matrix slice is identified. Subsequent passes identify and process a different row until all rows and the entire input data matrix slice have been processed. In some embodiments, the input data vector only utilizes a subset of the vector length supported by the matrix processor unit. For example, the input data vector may have 16 elements even though the matrix processor unit can receive 32-element vector operands. In some embodiments, the unused vector elements are filled with padding elements and/or zero-value elements.

At 603, the input data vector is broadcasted to applicable vector units. For example, the input data vector identified at 601 is prepared as a vector operand and broadcasted to selected vector units of the matrix processor unit. The selected vector units each receive two vector operands, a vector operand corresponding to the input data vector and a vector operand corresponding to a column of the manipulation matrix. At 603, the applicable vector units each receive the vector operand corresponding to the input data vector. Depending on the matrix manipulation operation, a subset or all vector units of the matrix processor unit are utilized. For example, a 32×32 matrix processor unit may utilize all 32 vector units in the case where the manipulation matrix has 32 columns. In the case where the manipulation matrix has 16 columns, only 16 vector units are utilized and the input data vector can be broadcasted only to the applicable 16 vector units. In various embodiments, the vector operands corresponding to each column of the manipulation matrix can be reused across multiple input data vectors. The applicable vector units only receive a new input data vector at 603.

At 605, vector unit operations are performed and the results are outputted. For example, every vector unit loaded with vector operands from a corresponding row of the input data matrix slice and a corresponding column of the manipulation matrix performs a dot product operation and outputs the resulting element to an output vector as a result. The results of the vector units correspond to a row of the result matrix. The length of the resulting output row is based on the number of vector units utilized. For example, in the event 16 vector units are utilized, each output row has 16 elements. Similarly, in the event 32 vector units are utilized, each output row has 32 elements, and so forth. In various embodiments, the dot product operation performed by each vector unit is performed by utilizing a vector multiply unit and a vector adder unit of each vector unit. In some embodiments, the output vector is received at an output unit such as output unit 151 of FIG. 1 and/or output unit 251 of FIG. 2. The output unit can output the resulting row (or collection of rows accumulated over time) to memory or another appropriate location.

At 607, a determination is made whether additional input data vectors require processing. In the event an additional input data vector remains to be processed, processing loops back to 601 to process the next input data vector. In the event no additional input data vector remains to be processed, processing ends.

Figure 7:
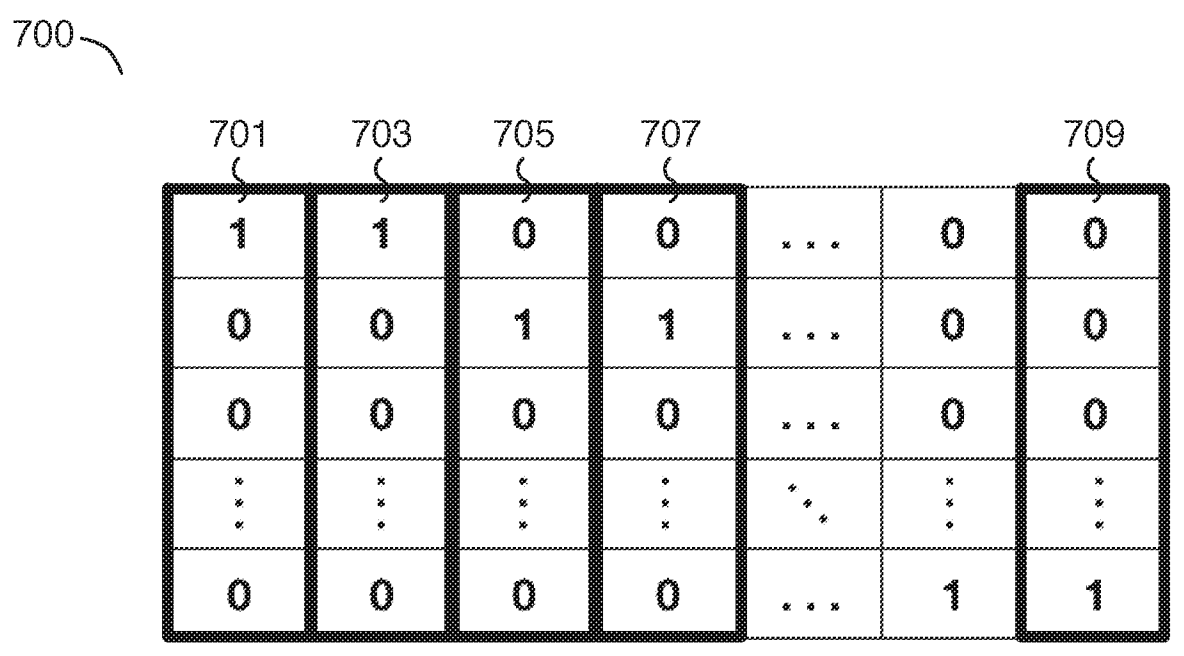

FIG. 7 is a diagram illustrating an example manipulation matrix and corresponding vector operands for performing a matrix manipulation operation. In FIG. 7, up-sampling manipulation matrix 700 represents an exemplar 16×32 manipulation matrix for performing up-sampling of a 32×16 input data matrix (not shown). The result of multiplying an input data matrix by up-sampling manipulation matrix 700 is to up-sample the rows of the input data matrix by a factor of 2 by repeating every element twice. Each element along a row of a 32×16 input data matrix is duplicated. Other dimensions for a manipulation matrix for up-sampling may be appropriate as well. Up-sampling manipulation matrix 700 is configured for a matrix processor unit with at least 32 vector units, where each vector unit takes vector operands with at least 16 elements. Up-sampling manipulation matrix 700 may be utilized by a 32×32 matrix processor unit, where the 32-element vector operands are padded with 16 padding or zero-value elements. In some embodiments, the matrix processor unit is matrix processor unit 107 of FIG. 1 and/or matrix processor unit 201 of FIG. 2. In some embodiments, the processes of FIGS. 3-6 are used to apply a manipulation matrix to an input data matrix.

In the example shown, up-sampling manipulation matrix 700 is a 16×32 manipulation matrix with 16 rows and 32 columns. Each column of up-sampling manipulation matrix 700 contains a single element with a value of 1.0. All remaining elements of the column have a value of 0.0. Each pair of columns has the 1.0 value element at the same row location. As the columns progress along the row dimension, the row location of the 1.0 value element changes. Columns 701 and 703 have the 1.0 value element at row 1, columns 705 and 707 have the 1.0 value element at row 2, and so forth, with column 709 having the 1.0 value element at row 16. The ellipses shown in up-sampling manipulation matrix 700 indicate additional elements not shown to fill out the 16×32 manipulation matrix using the described pattern.

The columns of up-sampling manipulation matrix 700, such as columns 701, 703, 705, 707, and 709, among others, are each loaded as vector operands into a corresponding vector unit of the matrix processor unit. For example, column 701 is a 16-element vector that is prepared as a vector operand for a first vector unit. A dot product is determined using a row of the input data matrix and the vector operand of column 701 to determine the first element of a row result. Similarly, a dot product is determined using the same row of the input data matrix with the vector operand of column 703 to determine the second element of the row result. Using the same row of the input data matrix, dot products are determined with the vector operands of columns 705 and 707 to determine the third and fourth elements, respectively, of the row result. The remaining row elements are similarly determined using the remaining columns of up-sampling manipulation matrix 700. The last element of the row result is computed by determining the dot product using the same row of the input data matrix with the vector operand of column 709. Using up-sampling manipulation matrix 700, each row result has 32 elements.

Figure 8:
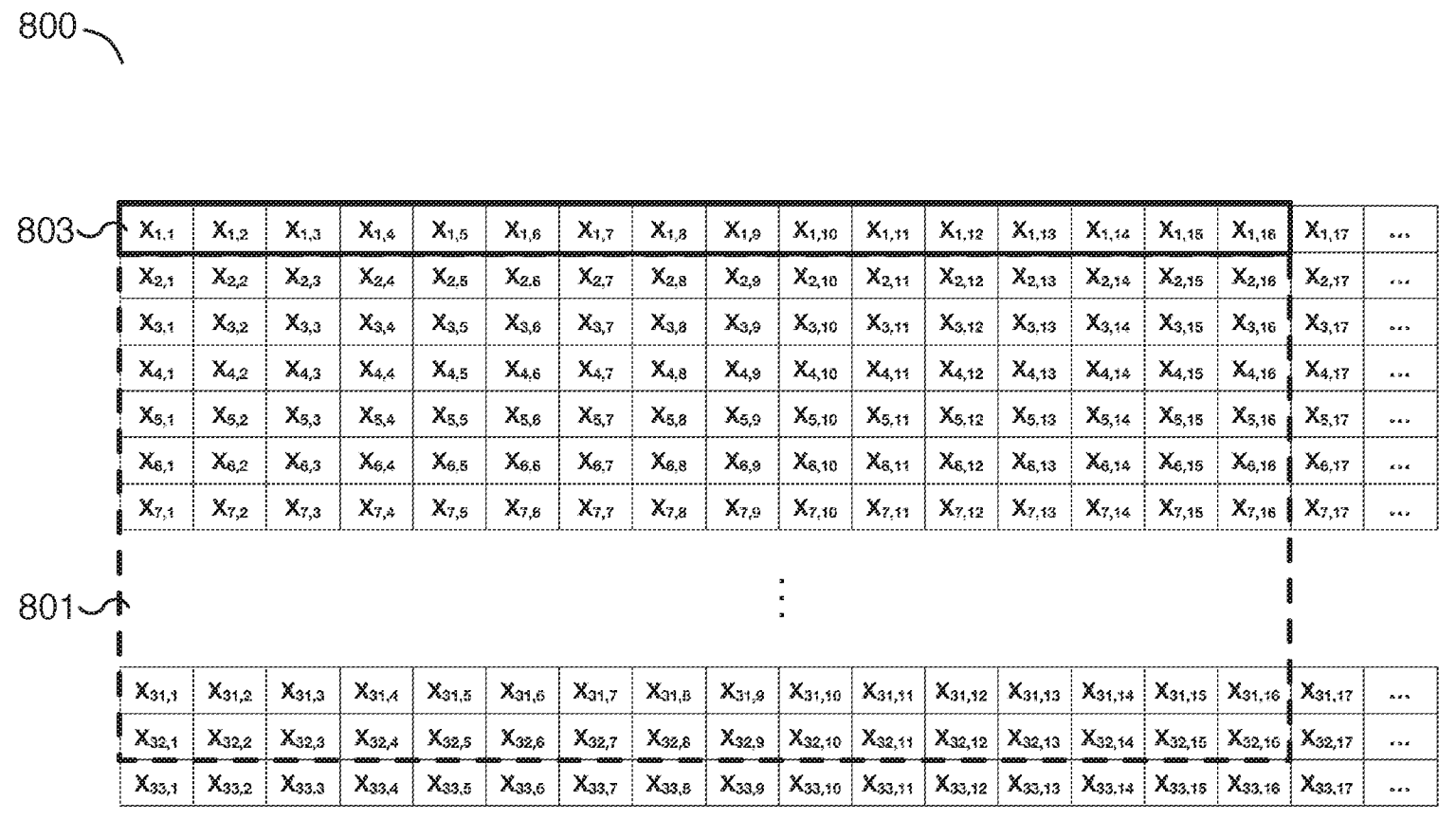

FIG. 8 is a diagram illustrating an example input data matrix and corresponding matrix slice for performing a matrix manipulation operation. Input data matrix 800 is a two-dimensional matrix. The size of input data matrix 800 may be larger than the supported dimensions of the matrix processor unit and/or may be incompatible in its original format with the applicable manipulation matrix. Input data matrix 800 is sliced into smaller matrices compatible with both the matrix processor unit and the manipulation matrix. For example, input matrix slice 801 is a two-dimensional matrix slice of input data matrix 800 compatible with a 32×32 matrix processor unit and up-sampling manipulation matrix 700. Input matrix slice 801 is a 32×16 matrix and up-sampling manipulation matrix 700 is a 16×32 matrix. The result matrix from multiplying input matrix slice 801 by up-sampling manipulation matrix 700 is a 32×32 result matrix that converts the first 16 columns of input data matrix 800 to a 32×32 output matrix. In various embodiments, different slices of input data matrix 800 are each processed and the results combined to up-sample the entire input data matrix. The input data matrix may be sliced into different dimensions depending on the matrix processor unit and the corresponding manipulation matrix. For some manipulation matrices, the different slices may overlap. For example, manipulation matrices that involve interpolating may require the different slices to overlap by one or more columns and/or rows. In some embodiments, the process of FIG. 5 is used to slice the input data matrix into compatible input matrix slices. In some embodiments, the processes of FIGS. 3-6 are used to apply a manipulation matrix to an input data matrix. In some embodiments, the matrix processor unit is matrix processor unit 107 of FIG. 1 and/or matrix processor unit 201 of FIG. 2.

In some embodiments, each row of input data matrix slice 801 is prepared as a vector operand. In the example shown, row 803 is the first row of input data matrix slice 801. In some embodiments, each row, such as row 803, is prepared as a vector operand and broadcasted to vector units of a matrix processor unit with corresponding columns of a manipulation matrix. In various embodiments, the vector operands of the matrix processor unit support dimensions larger than a row of the input matrix slice. Padding or zero-value elements can be used to fill out the remaining elements of a vector operand. For example, a matrix processor unit operating on 32-element vector operands receives a vector operand with the 16 elements of row 803 along with 16 padding elements. Depending on the matrix processor unit and the manipulation matrix, the size of the matrix data slice row and the number of padding units may change, as appropriate.

Figure 9:
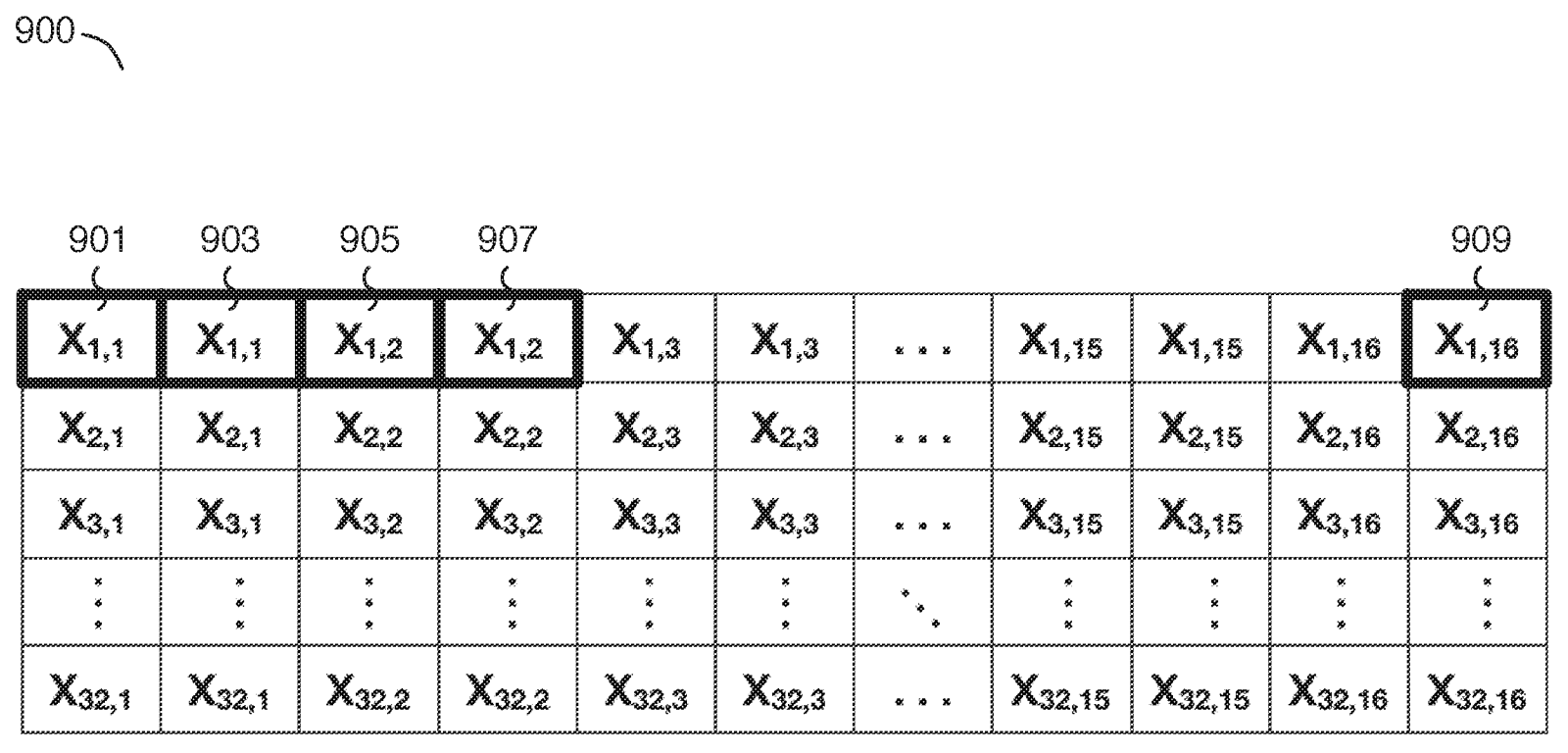

FIG. 9 is a diagram illustrating an example result matrix from performing a matrix manipulation operation. Result matrix 900 is a 32×32 two-dimensional matrix result determined by multiplying a 32×16 input data matrix, such as input data matrix slice 801 of FIG. 8, by a 16×32 manipulation matrix, such as up-sampling manipulation matrix 700 of FIG. 7. The elements of result matrix 900 are determined by computing the dot-product result of each row of the input data matrix with each column of the manipulation matrix. Elements 901, 903, 905, 907, and 909 are elements of the first row of result matrix 900. Elements 901, 903, 905, and 907 are elements of the first, second, third, and fourth columns, respectively, of result matrix 900. Element 909 is the element of the thirty-second and last column of result matrix 900.

In some embodiments, element 901 corresponds to the dot-product result of the first row of the input data matrix with the first column of the manipulation matrix. For example, in some embodiments, element 901 corresponds to the dot-product result of the vector operand corresponding to 16-element row 803 of input matrix slice 801 of FIG. 8 with the vector operand corresponding to 16-element column 701 of up-sampling manipulation matrix 700 of FIG. 7. Similarly, element 903 corresponds to the dot-product result of the same row from an input data matrix with the second column of a manipulation matrix, such as 16-element column 703 of up-sampling manipulation matrix 700 of FIG. 7. Elements 901 and 903 have the same value ($X_{1,1}$) as the element at the first row and first column of the input matrix slice. Elements 905 and 907 have the same value ($X_{1,2}$) as the element at the first row and second column of the input matrix slice. Their values correspond to the dot-product result of the same row from an input data matrix with the third and fourth columns, respectively, of a manipulation matrix, such as 16-element columns 705 and 707, respectively, of up-sampling manipulation matrix 700 of FIG. 7. For each row of result matrix 900, the elements of a corresponding row from the input data matrix are repeated twice to up-sample rows of the input data matrix by a factor of two. As an additional example, the last element of the first row of result matrix 900, element 909, has the same value ($X_{1,16}$) as the element at the first row and sixteenth column of the input matrix slice. The value corresponds to the dot-product result of the same row from an input data matrix with the sixteenth column of a manipulation matrix, such as 16-element column 709 of up-sampling manipulation matrix 700 of FIG. 7. In some embodiments, the processes of FIGS. 3-6 are used to apply a manipulation matrix to an input data matrix to determine result matrix 900. In some embodiments, the matrix processor unit used to perform the matrix manipulation operation is matrix processor unit 107 of FIG. 1 and/or matrix processor unit 201 of FIG. 2.

Figure 10:
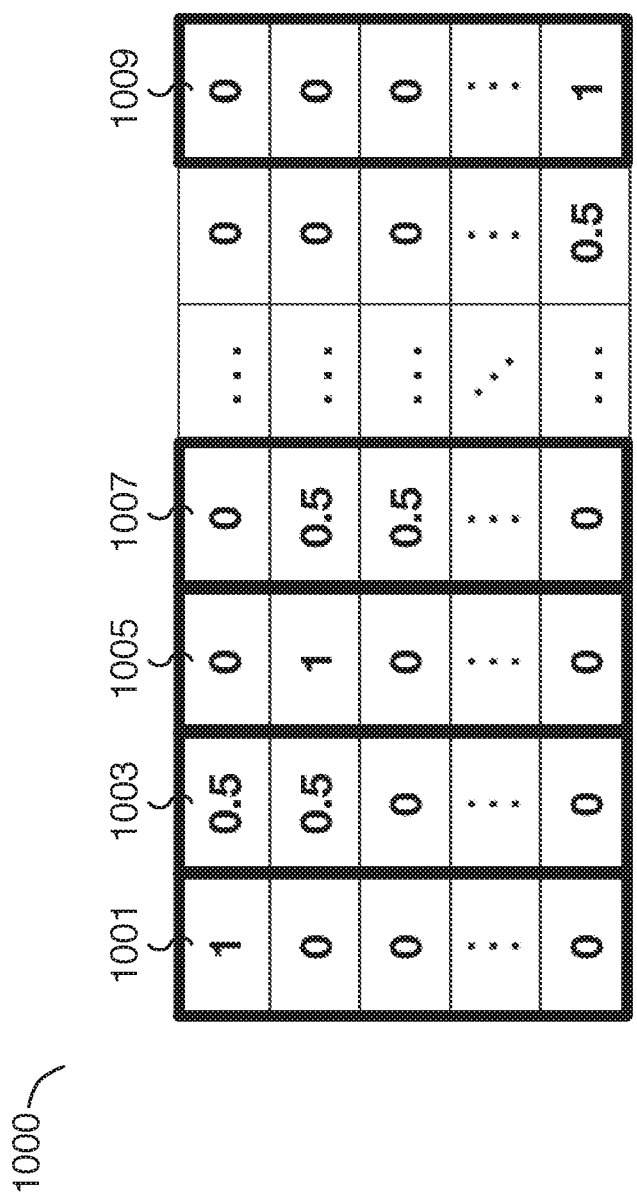
FIG. 10 is a diagram illustrating an example manipulation matrix and corresponding vector operands for performing a matrix manipulation operation.

FIG. 10 is a diagram illustrating an example manipulation matrix and corresponding vector operands for performing a matrix manipulation operation. In FIG. 10, up-sampling manipulation matrix 1000 represents an exemplar 16×31 manipulation matrix for performing up-sampling of a 32×16 input data matrix (not shown). The result of multiplying an input data matrix by up-sampling manipulation matrix 1000 is to up-sample the rows of the input data matrix by nearly a factor of 2 by linear interpolation. A 32×16 input data matrix is up-sampled to a 32×31 result matrix. Between every column of the original 16 columns of the input data matrix, an additional column is inserted by averaging neighboring columns. Other dimensions for a manipulation matrix for up-sampling may be appropriate as well. Up-sampling manipulation matrix 1000 is configured for a matrix processor unit with at least 31 vector units, where each vector unit takes vector operands with at least 16 elements. Up-sampling manipulation matrix 1000 may be utilized by a 32×32 matrix processor unit, where the 32 element vector operands are padded with 16 padding or zero-value elements. In some embodiments, the matrix processor unit is matrix processor unit 107 of FIG. 1 and/or matrix processor unit 201 of FIG. 2. In some embodiments, the processes of FIGS. 3-6 are used to apply a manipulation matrix to an input data matrix.

In the example shown, up-sampling manipulation matrix 1000 is a 16×31 manipulation matrix with 16 rows and 31 columns. Each column of up-sampling manipulation matrix 1000 contains either a single element with a value of 1.0 or a pair of elements each with a value of 0.5. All remaining elements of the column have a value of 0.0. Column 1001, the first column of up-sampling manipulation matrix 1000, is (1, 0, 0, . . . , 0) and results in the first column of the result matrix being equal to the first column of the input data matrix. Column 1003, the second column of up-sampling manipulation matrix 1000, is (0.5, 0.5, 0, . . . , 0) and results in the second column of the result matrix being equal to the average of the first and second columns of the input data matrix. Column 1005, the third column of up-sampling manipulation matrix 1000, is (0, 1, 0, . . . , 0) and results in the third column of the result matrix being equal to the second column of the input data matrix. Column 1007, the fourth column of up-sampling manipulation matrix 1000, is (0, 0.5, 0.5, . . . , 0) and results in the fourth column of the result matrix being equal to the average of the second and third columns of the input data matrix. This pattern continues until last column 1009. Column 1009, the last and thirty-first column of up-sampling manipulation matrix 1000, is (0, 0, 0, . . . , 1) and results in the last and thirty-first column of the result matrix being equal to the sixteenth column of the input data matrix. The ellipses shown in up-sampling manipulation matrix 1000 indicate additional elements not shown to fill out the 16×31 manipulation matrix using the described pattern.

The columns of up-sampling manipulation matrix 1000, such as columns 1001, 1003, 1005, 1007, and 1009, among others, are each loaded as vector operands into a corresponding vector unit of the matrix processor unit. For example, column 1001 is a 16-element vector that is prepared as a vector operand for a first vector unit. A dot product is determined using a row of the input data matrix and the vector operand of column 1001 to determine the first element of a row result. Similarly, a dot product is determined using the same row of the input data matrix with the vector operand of column 1003 to determine the second element of the row result. Using the same row of the input data matrix, dot products are determined with the vector operands of columns 1005 and 1007 to determine the third and fourth elements, respectively, of the row result. The remaining row elements are similarly determined using the remaining columns of up-sampling manipulation matrix 1000. The last element of the row result is computed by determining the dot product using the same row of the input data matrix with the vector operand of column 1009. Using up-sampling manipulation matrix 1000, each row result has 31 elements.

Figure 11:
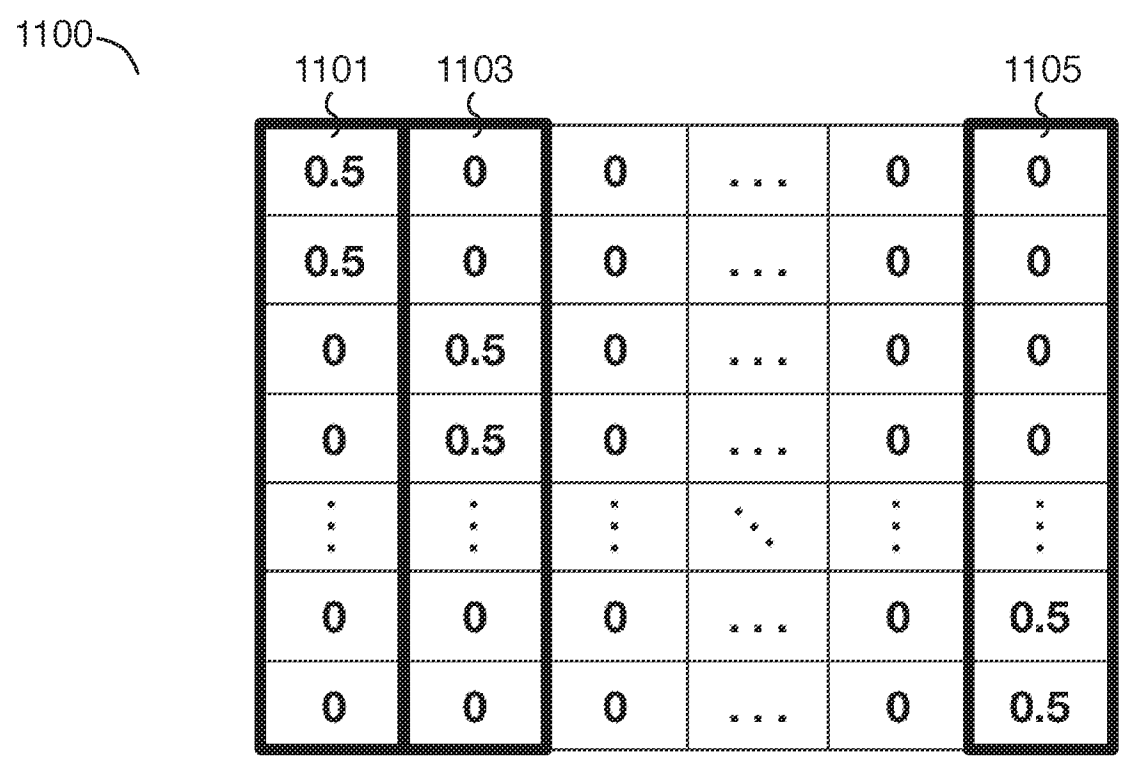

FIG. 11 is a diagram illustrating an example manipulation matrix and corresponding vector operands for performing a matrix manipulation operation. In FIG. 11, down-sampling manipulation matrix 1100 represents an exemplar 32×16 manipulation matrix for performing down-sampling of a 32×32 input data matrix (not shown). The result of multiplying an input data matrix by down-sampling manipulation matrix 1100 is to down-sample by pooling (or averaging) pairs of two elements in each row. A 32×32 input data matrix is down-sampled to a 32×16 result matrix. Each of the 16 columns in the result matrix is determined by averaging two columns of the input data matrix. Other dimensions for a manipulation matrix for down-sampling may be appropriate as well. Down-sampling manipulation matrix 1100 is configured for a matrix processor unit with at least 16 vector units, where each vector unit takes vector operands with at least 32 elements. Down-sampling manipulation matrix 1100 may be utilized by a 32×32 matrix processor unit, where only 16 of the total 32 vector units are used. In some embodiments, the matrix processor unit is matrix processor unit 107 of FIG. 1 and/or matrix processor unit 201 of FIG. 2. In some embodiments, the processes of FIGS. 3-6 are used to apply a manipulation matrix to an input data matrix.

In the example shown, down-sampling manipulation matrix 1100 is a 32×16 manipulation matrix with 32 rows and 16 columns. Each column of down-sampling manipulation matrix 1100 contains a pair of elements each with a value of 0.5. All remaining elements of the column have a value of 0.0. Column 1101, the first column of down-sampling manipulation matrix 1100, is (0.5, 0.5, 0, 0, ..., 0) and results in the first column of the result matrix being equal to the average of the first and second columns of the input data matrix. Column 1103, the second column of down-sampling manipulation matrix 1100, is (0, 0, 0.5, 0.5, 0, ..., 0) and results in the second column of the result matrix being equal to the average of the third and fourth columns of the input data matrix. This matrix element pattern continues until last column 1105. Column 1105, the last and sixteenth column of down-sampling manipulation matrix 1100, is (0, 0, ..., 0, 0, 0.5, 0.5) and results in the last and sixteenth column of the result matrix being equal to the average of the fifteenth and sixteenth columns of the input data matrix. The ellipses shown in down-sampling manipulation matrix 1100 indicate additional elements not shown to fill out the 32×16 manipulation matrix using the described pattern.

The columns of down-sampling manipulation matrix 1100, such as columns 1101, 1103, and 1105, among others, are each loaded as vector operands into a corresponding vector unit of the matrix processor unit. For example, column 1101 is a 32-element vector that is prepared as a vector operand for a first vector unit. A dot product is determined using a row of the input data matrix and the vector operand of column 1101 to determine the first element of a row result. Similarly, a dot product is determined using the same row of the input data matrix with the vector operand of column 1103 to determine the second element of the row result. The remaining row elements are similarly determined using the remaining columns of down-sampling manipulation matrix 1100. The last element of the row result is computed by determining the dot product using the same row of the input data matrix with the vector operand of column 1105. Using down-sampling manipulation matrix 1100, each row result has 16 elements.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A processor system, comprising:
   a shared memory; and
   a processing element in communication with the shared memory, wherein the processing element includes a matrix processor unit and the processing element is configured to:
   receive a processor instruction specifying a data matrix and a matrix manipulation operation without directly specifying a manipulation matrix, wherein processing element is able to selectively perform a plurality of different types of matrix manipulation operations including a matrix dimension up-sampling type operation and a matrix dimension down-sampling type operation, and the matrix manipulation operation specified by the received processor instruction is one of the plurality of different types of matrix manipulation operations;
   automatically select from a repository of predefined manipulation matrix selection options, the manipulation matrix based on the matrix manipulation operation specified in the processor instruction;
   load the data matrix and the manipulation matrix into the matrix processor unit;
   perform a matrix operation to determine a result matrix; and
   output the result matrix to a destination location.

2. The system of claim 1, wherein the data matrix is retrieved from the shared memory.

3. The system of claim 1, wherein the manipulation matrix is retrieved from the shared memory.

4. The system of claim 1, wherein the manipulation matrix is retrieved from a local memory of the processing element.

5. The system of claim 1, wherein the matrix operation performed is a matrix multiplication operation.

6. The system of claim 1, wherein the destination location is the shared memory.

7. The system of claim 1, wherein the destination location is a storage on the processing element.

8. The system of claim 1, wherein the processing element is one of a plurality of processing elements configured to operate in parallel.

9. The system of claim 1, wherein the result matrix is outputted to the destination location using an output unit.

10. The system of claim 9, wherein the output unit is configured to perform multiple duplicative writes to output an up-sampled result matrix.

11. The system of claim 1, wherein the manipulation matrix is an up-sampling matrix.

12. The system of claim 11, wherein the up-sampling matrix is configured to perform a linear interpolation between row elements.

13. The system of claim 1, wherein the manipulation matrix is a down-sampling matrix.

14. The system of claim 1, wherein the matrix processor unit includes:
   a first type of register configured to store values of a single row of the data matrix;
   a group of a second type of registers, wherein each of the second type of registers is configured to store values of a different column of the manipulation matrix; and
   a plurality of vector calculation units, wherein each of the plurality of vector calculation units corresponds to one of the second type of registers, and each of the vector calculation units is configured to multiply each value stored in the first type of register with a corresponding value stored in the corresponding one of the second type of registers and sum together multiplication results of the corresponding vector calculation unit to at least in part determine a corresponding element in the result matrix of multiplying the data matrix with the manipulation matrix.

15. The system of claim 14, wherein the first type of register is configured to broadcast contents to each of the plurality of vector calculation units.

16. The system of claim 14, wherein each of the plurality of vector calculation units includes a vector multiply unit and a vector adder unit.

17. A method, comprising:
   receiving at a processing element a processor instruction specifying a data matrix and a matrix manipulation operation without directly specifying a manipulation matrix wherein processing element is able to selectively perform a plurality of different types of matrix manipulation operations including a matrix dimension up-sampling type operation and a matrix dimension down-sampling type operation, and the matrix manipulation operation specified by the received processor instruction is one of the plurality of different types of matrix manipulation operations;

automatically selecting from a repository of predefined manipulation matrix selection options, the manipulation matrix based on the matrix manipulation operation specified in the processor instruction;

loading the data matrix and the manipulation matrix into a matrix processor unit of the processing element;

performing a matrix operation to determine a result matrix; and outputting the result matrix to a destination location.

18. The method of claim 17, wherein loading the data matrix and the manipulation matrix into the matrix processor unit further comprises:

loading each one of a column of the manipulation matrix into one of a plurality of vector calculation units; and broadcasting a row of the data matrix to each of the plurality of vector calculation units;

wherein performing the matrix operation to determine the result matrix further comprises:

for each of the plurality of vector calculation units:

multiplying elements of the broadcasted row of the data matrix with corresponding elements of the corresponding loaded column of the manipulation matrix to determine multiplication results; and summing together the multiplication results of the corresponding vector calculation unit to determine a corresponding element of a corresponding row of the result matrix of multiplying the data matrix with the manipulation matrix.

19. A processor system, comprising:

a shared memory; and a plurality of processing elements configured to operate in parallel, wherein at least one processing element of the plurality of processing elements is configured to receive a processor instruction specifying a data matrix and a matrix manipulation operation without directly specifying a manipulation matrix and includes:

a control unit configured to decode the processor instruction to identify the data matrix and determine the manipulation matrix including by being configured to automatically select from a repository of predefined manipulation matrix selection options, the manipulation matrix based on the matrix manipulation operation specified in the processor instruction; and a matrix processor unit, including:

a first type of register configured to store values of a single row of the data matrix;

a group of a second type of registers, wherein each of the second type of registers is configured to store values of a different column of the manipulation matrix; and a plurality of vector calculation units, wherein each of the plurality of vector calculation units corresponds to one of the second type of registers, and each of the vector calculation units is configured to multiply each value stored in the first type of register with a corresponding value stored in the corresponding one of the second type of registers and sum together multiplication results of the corresponding vector calculation unit to at least in part determine a corresponding element of a corresponding row in a result matrix of multiplying the data matrix with the manipulation matrix;

wherein each of the processing elements is able to selectively perform a plurality of different types of matrix manipulation operations including a matrix dimension up-sampling type operation and a matrix dimension down-sampling type operation, and the matrix manipulation operation specified by the received processor instruction is one of the plurality of different types of matrix manipulation operations.

20. The system of claim 19, wherein the manipulation matrix is retrieved from the shared memory based on a decoding result of the processor instruction.

* * * * *